(12) United States Patent
White

(10) Patent No.: US 8,209,719 B2
(45) Date of Patent: Jun. 26, 2012

(54) SYSTEM FOR PRESENTING STATUS INFORMATION ASSOCIATED WITH A MEDIA CONTENT PROCESSOR

(75) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 727 days.

(21) Appl. No.: 11/847,067

(22) Filed: Aug. 29, 2007

(65) Prior Publication Data

US 2009/0064240 A1  Mar. 5, 2009

(51) Int. Cl.
*H04N 5/445* (2011.01)
*G06F 3/00* (2006.01)
*G06F 13/00* (2006.01)

(52) U.S. Cl. ............. 725/43; 725/25; 725/28; 725/51; 725/52; 725/86; 725/109; 725/112; 725/136; 715/808

(58) Field of Classification Search .......... 725/25, 725/28, 51, 86, 109, 112, 136, 43, 52; 715/808
See application file for complete search history.

(56) References Cited

U.S. PATENT DOCUMENTS

| | | | | |
|---|---|---|---|---|
| 5,995,101 A * | 11/1999 | Clark et al. | ................ | 715/711 |
| 7,212,249 B1 * | 5/2007 | Casement et al. | ............ | 348/564 |
| 7,460,570 B2 * | 12/2008 | Kasai | ............... | 372/22 |
| 2001/0051998 A1 * | 12/2001 | Henderson | ................ | 709/217 |
| 2002/0038358 A1 * | 3/2002 | Sweatt et al. | ............... | 709/218 |
| 2002/0040475 A1 * | 4/2002 | Yap et al. | ............... | 725/39 |
| 2002/0046407 A1 * | 4/2002 | Franco | ............. | 725/110 |
| 2002/0174430 A1 * | 11/2002 | Ellis et al. | ............... | 725/46 |
| 2002/0184635 A1 * | 12/2002 | Istvan | ............... | 725/51 |
| 2003/0005446 A1 * | 1/2003 | Jaff et al. | ............... | 725/51 |
| 2003/0095791 A1 * | 5/2003 | Barton et al. | ............... | 386/83 |
| 2005/0028208 A1 * | 2/2005 | Ellis et al. | ............... | 725/58 |
| 2005/0177745 A1 * | 8/2005 | Oswald et al. | ............... | 713/201 |
| 2006/0026289 A1 | 2/2006 | Lindersay et al. | | |
| 2006/0200773 A1 | 9/2006 | Nocera et al. | | |
| 2007/0107019 A1 * | 5/2007 | Romano et al. | ............... | 725/80 |
| 2007/0143493 A1 * | 6/2007 | Mullig et al. | ............... | 709/232 |
| 2007/0204308 A1 * | 8/2007 | Nicholas et al. | ............... | 725/86 |
| 2008/0155600 A1 * | 6/2008 | Klappert et al. | ............... | 725/44 |
| 2010/0111494 A1 * | 5/2010 | Mazzaferri | ............... | 386/68 |

FOREIGN PATENT DOCUMENTS

WO  2007035426  3/2007

* cited by examiner

*Primary Examiner* — Jason Salce
(74) *Attorney, Agent, or Firm* — Guntin Meles & Gust, PLC; Pablo Meles

(57) ABSTRACT

A system that incorporates teachings of the present disclosure may include, for example, a computing device having a controller adapted to monitor one or more activities taking place at a media content processor, and present an iconic symbol in a graphical user interface window adjusted according to the one or more activities being monitored. Other embodiments are disclosed.

24 Claims, 5 Drawing Sheets

SYSTEM FOR PRESENTING STATUS INFORMATION ASSOCIATED WITH A MEDIA CONTENT PROCESSOR

FIELD OF THE DISCLOSURE

The present disclosure relates generally to media content processors and more specifically to a system for presenting status information associated with a media content processor.

BACKGROUND

Media content processors such as Set-Top Box (STB) receivers have evolved in sophistication thereby offering subscribers a number of services such as high definition TV decoding, media content recording with a Digital Video Recorder (DVR) service managed thereby, storage of subscriber content (music, home videos, pictures), downloading of media content from on-demand catalogs, and so on. Monitoring operations of a media content processor however can be cumbersome.

DETAILED DESCRIPTION

In one embodiment of the present disclosure, a computer-readable storage medium operating in a computing device can have computer instructions for establishing communications with a Set-Top Box (STB) receiver, receiving from the STB receiver information associated with one or more content management activities taking place at the STB receiver, presenting an iconic symbol in a Graphical User Interface (GUI) window of the computing device, and adjusting the iconic symbol in the GUI window according to the one or more content management activities.

In one embodiment of the present disclosure, a computing device can have a controller adapted to monitor one or more activities taking place at a media content processor, and present an iconic symbol in a GUI window adjusted according to the one or more activities being monitored.

In one embodiment of the present disclosure, a content media processor can have a controller adapted to transmit to a computing device one or more activities taking place at the media content processor to present at the computing device an iconic symbol adjusted according to the one or more activities.

Figure 1:
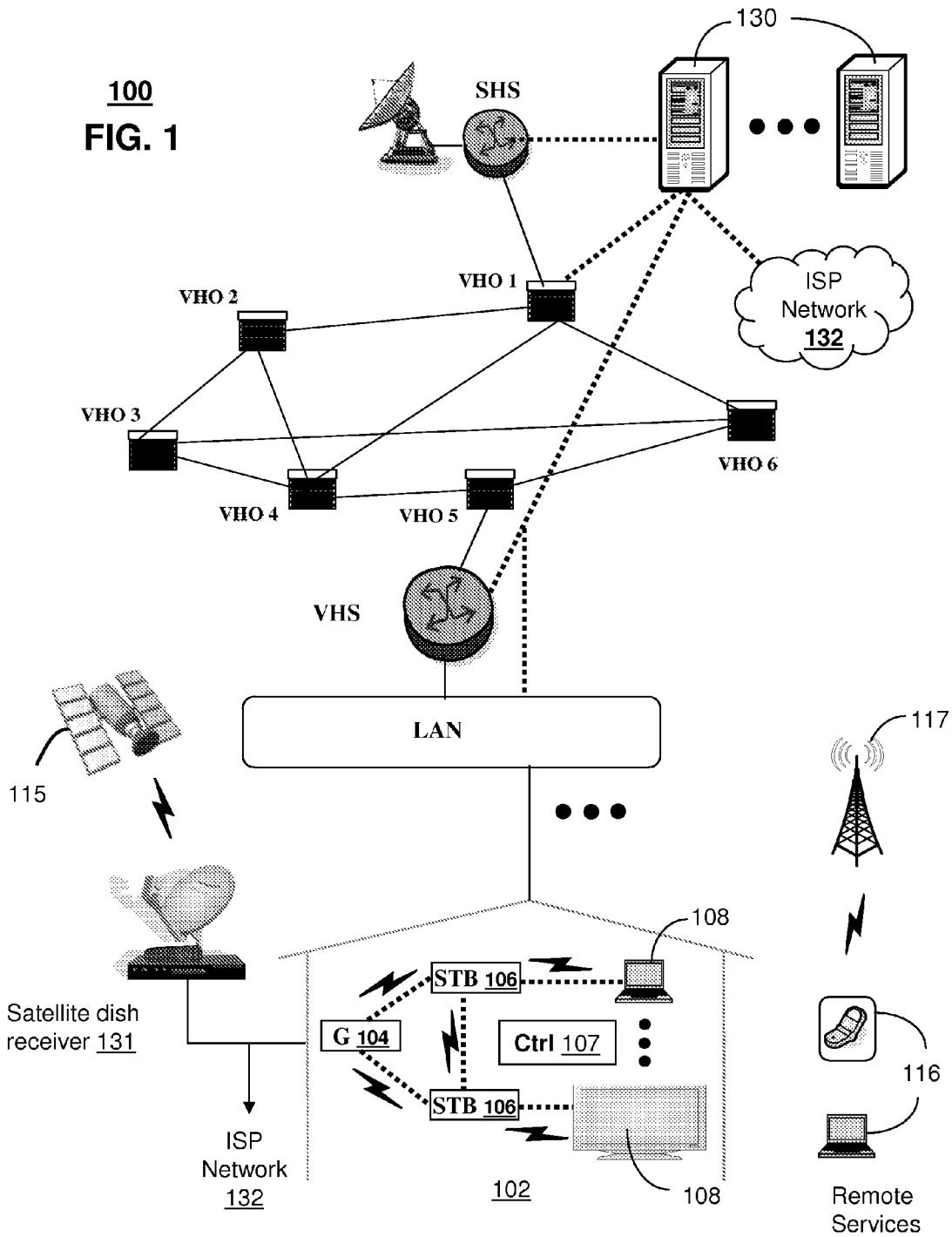
FIG. 1 depicts an exemplary embodiment of a communication system.

FIG. 1 depicts an exemplary embodiment of a communication system 100. The communication system 100 can represent an IPTV broadcast media system. In a typical IPTV infrastructure, there is at least one super head office server (SHS) which receives national media programs from satellite and/or media servers from service providers of multimedia broadcast channels. In the present context, media programs can represent audio only content, video only content, and combinations thereof. The SHS server forwards IP packets associated with the media content to video head servers (VHS) via a network of video head offices (VHO) according to a common multicast communication method.

The VHS then distributes multimedia broadcast programs to commercial and/or residential buildings 102 housing a gateway 104 (e.g., a residential gateway or RG). The gateway 104 distributes broadcast signals to media content processors 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media content processors 106 and subsystems of the IPTV media system for services such as video-on-demand (VoD).

The IPTV media system can be coupled to one or more computing devices 130 that can operate as a web or Internet server for providing portal services over an Internet Service Provider (ISP) network 132 to fixed media devices 108 or portable communication devices 116 by way of a wireless base station 117 such as in a cellular communication network operating with common protocols (GSM, CDMA, etc.).

A satellite broadcast system can be used in place of the IPTV media system. In this embodiment, signals transmitted by a satellite 115 can be intercepted by a satellite dish receiver 131 coupled to building 102 which conveys satellite media signals to the media content processors 106 by way of gateway 104. Alternatively, the satellite signals can be received and processed by the media content processor 106 over a satellite port of the media content processor coupled to the satellite dish receiver 131. The media content processors 106 can also be equipped with a broadband port that couples to the ISP network 132 for general broadband access.

Although not shown, the communication system 100 can also be combined or replaced with analog or digital broadcast distributions systems such as cable TV systems. It would be apparent therefore to one of ordinary skill in the art that the present disclosure can be applied to any media content system.

Figure 2:
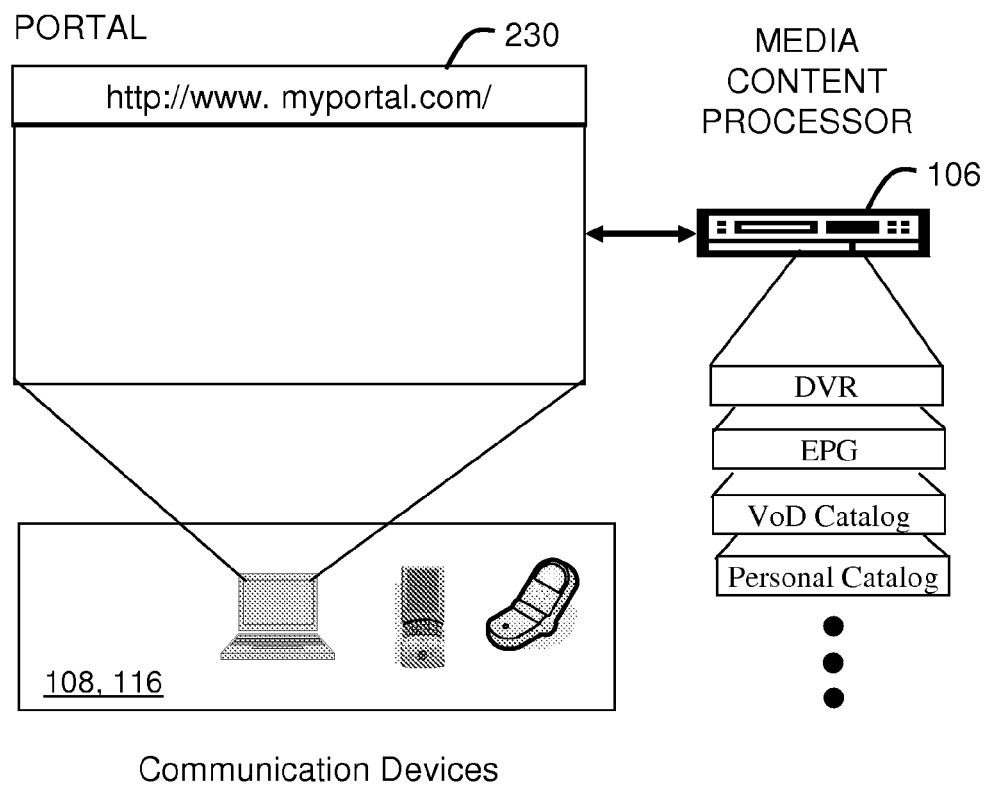
FIG. 2 depicts an exemplary embodiment of a portal of the communication system.

FIG. 2 depicts an exemplary embodiment of a portal 230 of the communication system 100. In FIG. 2, the portal 230 can be accessed by a URL with a common browser such as Microsoft's Internet Explorer using an Internet-capable fixed or portable communication device 108, 116. The portal 230 can be configured to access a media content processor 106 such as the STB of FIG. 1 and services managed thereby such as a Digital Video Recorder (DVR), an Electronic Programming Guide (EPG), Video on Demand (VoD) catalog, a personal catalog stored in the STB (e.g., personal videos, pictures, audio recordings, etc.), and so on by way of the gateway 104.

Figure 3:
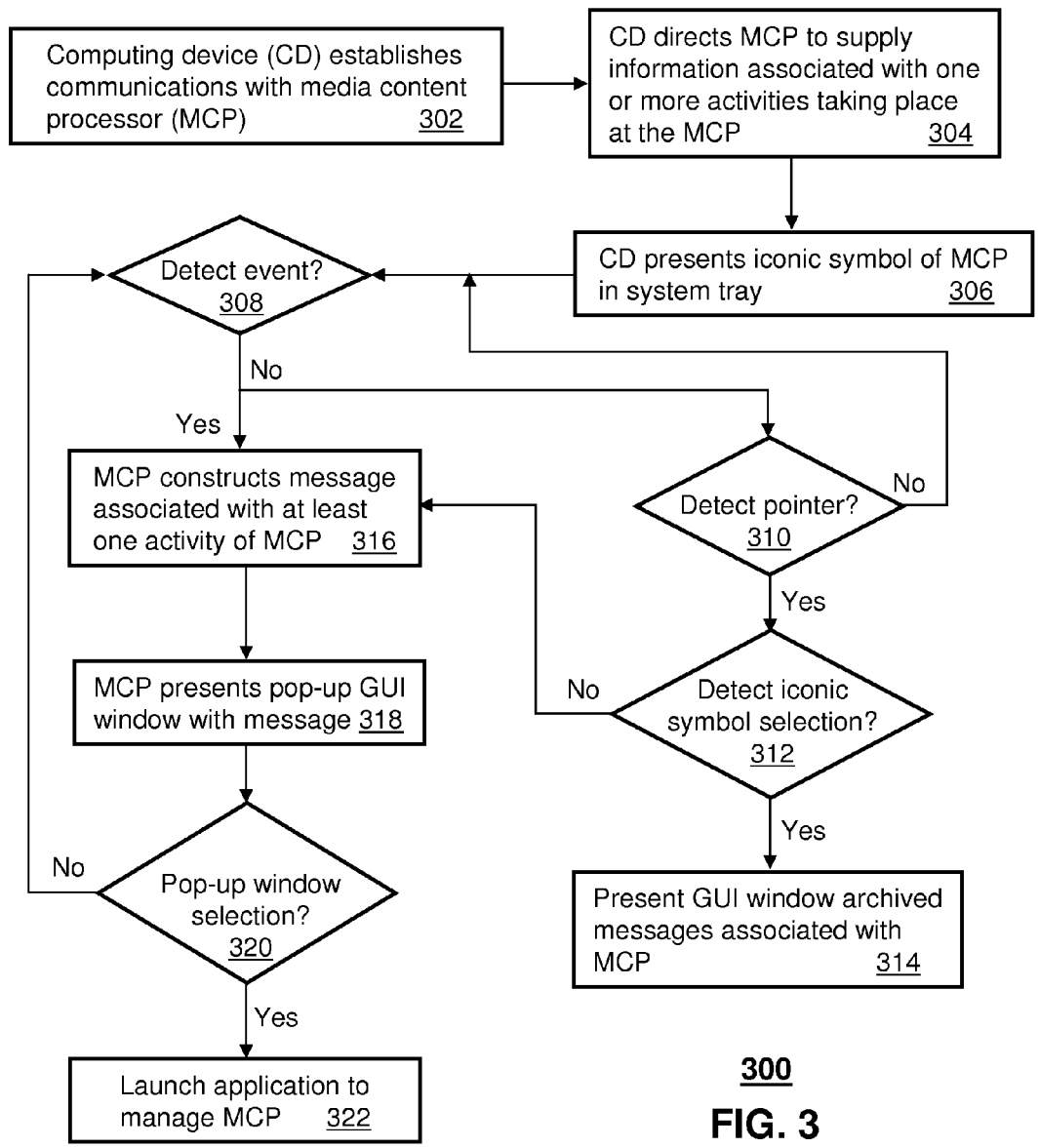
FIG. 3 depicts an exemplary method operating in portions of the communication system.

FIG. 3 depicts an exemplary method 300 operating in portions of the communication system 100. Method 300 begins with step 302 in which a computing device establishes communications with a media content processor 106 (herein referred to as MCP 106). A computing device in the present context can refer to a portable or fixed communications device such as a desktop computer, a laptop computer, a cell phone, a personal digital assistant or other suitable device that is capable of communicating with the MCP 106 by any of the communication means illustrated in FIG. 1. For illustration purposes only, the computing device referred to in step 302 will be assumed to be a laptop computer 108 located in building 102 which is networked to the MCPs 106 by common wired or wireless means (e.g., Ethernet, WiFi, Bluetooth, etc.). For convenience, the laptop computer 108 will be referred to as CD 108.

The CD 108 can establish secure communications in step 302 by utilizing a login and password technique. Additionally, communications can be further secured by applying an encryption technique (e.g., WiFi Protected Access or WPA) to the communication medium used between the CD 108 and the MCP 106. Upon establishing communications, the CD 108 can direct the MCP 106 to supply it information associated with one or more activities taking place at the MCP for monitoring purposes. The activities monitored can include for example a recording status of a media program recorded by a Digital Video Recorder (DVR) service managed by the MCP 106, a download status of media content supplied by a Video on Demand (VoD) service provided by the communication system 100, and/or an operational status of the MCP (e.g., broadband service operational or malfunctioning, memory usage statistics, CPU usage statistics, application statistics, etc.).

Figure 4:
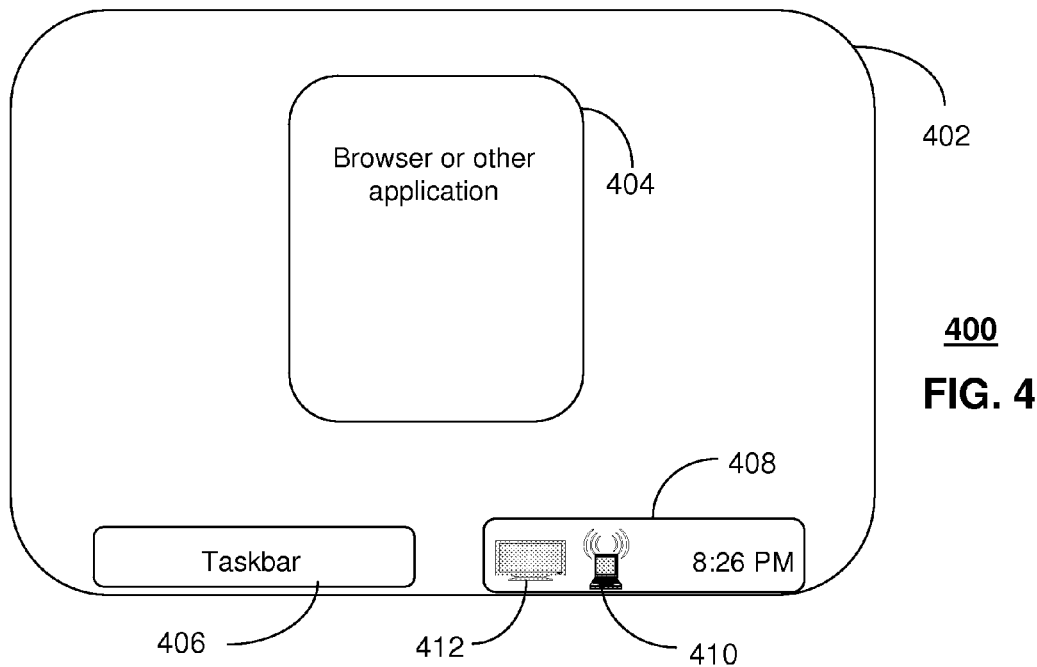
FIGS. 4-5 depict exemplary graphical user interface (GUI) windows presented by a computing device of the communication system.

To inform a subscriber of these monitored activities, the CD 108 can present an iconic symbol of the MCP in a system tray of the operating system used by the CD. For example, if the CD 108 is utilizing Microsoft Windows XP Professional™, the iconic symbol can be placed as shown in FIG. 4 at the bottom right of the general GUI window 402 (often referred to as the Desktop area) in system tray 408. Any iconic symbol can be used to symbolically represent the MCP 106. In the present illustration, iconic symbol 412 is used to symbolize a widescreen television which is distinguishable from other iconic symbols such as a WiFi connection symbol 410. The widescreen television helps to symbolically establish a reference to the MCP 106 which manages presentations therefor.

The general GUI window 402 can also include other graphics such as a sub-GUI window 404 for a browser or other application (e.g., Microsoft Word™, Microsoft PowerPoint™, etc.). The operating system used by the CD 108 can also provide a taskbar GUI window 406 with shortcuts for launching applications. Usually, iconic symbols shown in a system tray correspond to thin client software applications which are launched automatically by the operating system when the CD 108 is turned on. Accordingly, the steps presented by method 300 in whole or in part can be one among other applications operating as a background process.

With these principles in mind, the CD 108 proceeds to step 308 where it checks for one or more events that may be of interest to the subscriber. The event can be triggered by the one or more activities being monitored. For example, the CD 108 can be programmed in this step to check for the completion or partial completion of a DVR recording or media content download from a VoD catalog. The CD 108 can also check for faults detected by the MCP 106 (e.g., broadband port lost connection, MCP experiences a memory overrun, CPU resources exceed a threshold, packet losses are high, bit error rate is high, packet retransmissions are high, etc.). Some of these events can be predefined while others may be defined by the subscriber.

For example, the CD 106 can be programmed to provide a primary subscriber (e.g., an administrator) a GUI interface to establish events of interest such as a status of the media programs being consumed by other subscribers in building 102, a history of the media content browsed by these other subscribers, and so on. The service provider of the MCP 106 supplying software that implements the steps of method 300 can pre-provision it to capture DVR and VoD orders that are likely to be of interest to most subscribers. The CD 106 can be programmed to allow subscribers to change these default settings.

Referring back to step 308, if an event such as those described above is detected, the CD 108 can proceed to step 316 where it constructs a message associated with at least one activity of the MCP 106 having to do with the detected event. For example, the message can be something like, "A DVR recording of 24 has begun—8:00-9:00 PM"; "DVR recording of 24 has finished", "An episode of 24 that you have not yet watched has been found on channel XX, would you like to record it?"; "Download of 'The Matrix' is complete"; "MCP has lost broadband connection, please follow the troubleshooting instructions below", etc.

Figure 5:
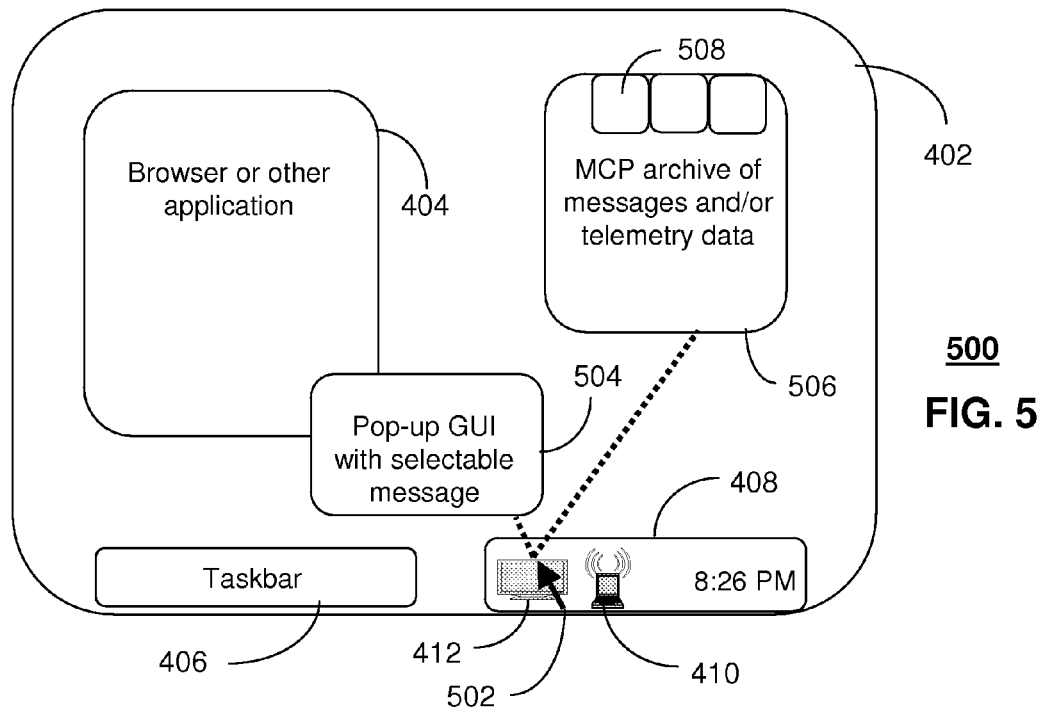

Messages such as these can be presented in step 318 as a pop-up GUI window 504 as shown in FIG. 5. In step 320, the CD 108 can detect whether the subscriber has selected the pop-up GUI window 504 with a pointer 502 directed by a common navigation device such as a mouse. If no selection is detected, the CD 108 proceeds to step 308 where it continues to monitor new events. If for example the pointer 504 is placed on the pop-up GUI window 504 and the left mouse button is clicked, the CD 108 can be programmed in step 322 to launch an application to manage the MCP 106 in relation to the event message displayed in the pop-GUI window. In the case of the DVR update, the application can be used to manage settings of the DVR, or to launch the recorded media program. Similar software can be launched by the CD 106 to manage VoD settings, downloads, parental controls, etc.

Referring back to step 308, if no event of interest is detected, the CD 108 can proceed to step 310 where it checks whether the mouse pointer 502 is in a vicinity of the iconic symbol 412. A representation of this is shown in FIG. 5. When pointer 502 is positioned at or near the iconic symbol 412, the CD 106 can be programmed to construct in step 316 a message with information associated with at least one of the monitored activities of the MCD 106 if the CD also does not detect in step 312 a selection of the iconic symbol (e.g., by left-clicking the mouse button while pointer 502 is above said symbol). Once the message has been constructed in step 316, the CD 106 can present a pop-up GUI window 504 with the message of step 318. The message can show status information associated with the MCP 106 (e.g., "DVR recording in progress"; "VoD download in progress"; "All resources are operating normally"; etc.). The CD 106 can proceed from step 318 to steps 320-322 as previously described.

Referring back to step 312, if the CD 108 detects that the iconic symbol 412 has been selected, the CD can proceed to step 314 where it presents a GUI window 506 which can be used to present an archive of time-stamped messages that were previously viewed or missed by the subscriber. The archived messages can be presented in a general tab of the GUI window 506. Other tabs 508 can be used to present other useful information such as telemetry data, statistics, information pertaining to other subscribers, logs of parental control violations, etc.

Upon reviewing the aforementioned embodiments, it would be evident to an artisan with ordinary skill in the art that said embodiments can be modified, reduced, or enhanced without departing from the scope and spirit of the claims described below. Method 300 can be adapted to a situation in which the computing device is a portable communication device 116 (referred to as CD 116) connected to the MCP 106 by way of portal 230. In this embodiment step 302 is adapted so that the CD 116 establishes communications with the portal 230 to gain access to the MCP 106 by way of gateway 104 over the ISP network 132. To secure communications, the portal 230 can be programmed to supply security information to the gateway 104 and/or the MCP 106.

In yet another embodiment, method 300 can be adapted so that the MCP 106 is programmed to proactively send messages to the CD 108 or 116 when an event of interest is detected. For example, the MCP 106 can be programmed to submit a message to the MCP 106 that a memory fault was detected, a DVR recording was interrupted due to a signal or power outage, media content that may be of interest to a subscriber was found from scanning an EPG listing, VoD catalog, or a general Internet source of media content (e.g., blogs, podcasts, etc.). The message transmitted by the MCP 106 can be posted in the pop-up GUI window 504 of FIG. 5.

These are but a few examples of modifications that can be applied to the present disclosure without departing from the scope of the claims. Accordingly, the reader is directed to the claims section for a fuller understanding of the breadth and scope of the present disclosure.

Figure 6:
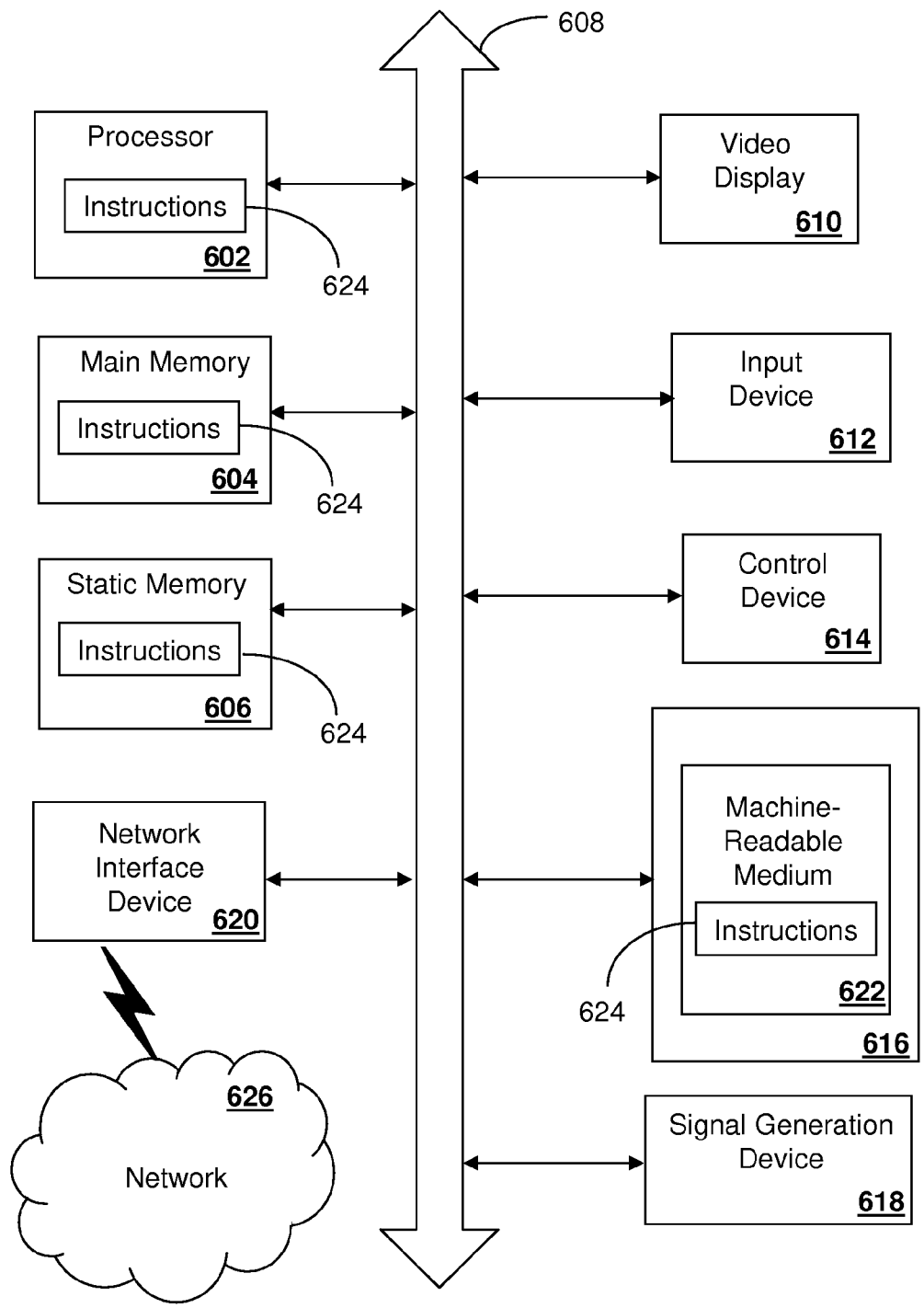
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium operating in a computing device, comprising computer instructions for:
    facilitating establishment of communications with a set top box receiver located remotely from the computing device;
    receiving from the set top box receiver information associated with one or more content management activities taking place at the set top box receiver;
    presenting an iconic symbol in a graphical user interface window of the computing device;
    adjusting the iconic symbol in the graphical user interface window according to a plurality of content management activities taking place at the set top box receiver, wherein the plurality of content management activities comprise at least a download status of media content supplied by a video-on-demand service;
    constructing a selectable message associated with at least one of the one or more content management activities;
    presenting the selectable message in a pop-up graphical user interface window positioned near the iconic symbol within the graphical user interface window of the computing device;
    constructing a plurality of messages associated with at least the download status of media content supplied by the video-on-demand service;
    storing an archive of the plurality of messages, each message being stored with a time stamp; and
    presenting the plurality of messages responsive to detecting a selection of the iconic symbol.

2. The non-transitory computer-readable storage medium of claim 1, wherein the computing device corresponds to one among a computer and a portable communication device and wherein the iconic symbol is presented within a system tray within the graphical user interface window of the computing device.

3. The non-transitory computer-readable storage medium of claim 1, wherein the one or more content management activities further comprise a recording status of a media program recorded by a digital video recorder service managed by the set top box receiver.

4. The non-transitory computer-readable storage medium of claim 1, wherein the graphical user interface window of the computing device is a system tray of an operating system of the computing device.

5. The non-transitory computer-readable storage medium of claim 4, comprising computer instructions for:
    detecting a pointer of a mouse in a vicinity of a location of the iconic symbol in the graphical user interface window; and
    presenting the pop-up graphical user interface window with the selectable message responsive to said detection.

6. The non-transitory computer-readable storage medium of claim 4, comprising computer instructions for:
    detecting one or more events from information associated with the one or more content management activities;
    constructing the selectable message according to the one or more events; and
    presenting the pop-up graphical user interface window with the selectable message responsive to said detection.

7. The non-transitory computer-readable storage medium of claim 1, comprising computer instructions for:
    presenting the plurality of messages in the graphical user interface window responsive to detecting a selection of the iconic symbol, wherein the presentation includes displaying message information representative of the archive of time-stamped messages that were previously viewed or missed by the subscriber.

8. The non-transitory computer-readable storage medium of claim 4, comprising computer instructions for:
    detecting a selection of the pop-up graphical user interface window by a mouse pointer; and
    launching an application associated with the message.

9. The non-transitory computer-readable storage medium of claim 1, wherein the iconic symbol is a representation of the set top box receiver, and wherein the iconic symbol is positioned in a system tray of an operating system of the computing device.

10. A computing device, comprising:
    a memory comprising computer instructions; and
    a controller coupled to the memory, wherein the controller when executing the computer instructions is configured to:
    monitor remotely over an Internet Protocol Television network one or more activities taking place at a media content processor, wherein the one or more activities comprise at least a download status of media content supplied by a video-on-demand service;

present an iconic symbol in a graphical user interface window, the iconic symbol being symbolically representative of the media content processor;
adjust the iconic symbol according to a plurality of activities being monitored when the activities are being performed, wherein the plurality of activities comprise set top box operational information other than recording status;
constructing a plurality of messages associated with at least the download status of media content supplied by the video-on-demand service;
storing an archive of the plurality of messages; and
presenting the plurality of messages responsive to detecting a selection of the iconic symbol.

11. The computing device of claim 10, wherein the computing device corresponds to at least one among a cell phone, a personal digital assistant, and a computer, and wherein the media content processor corresponds to one among a satellite media content process, an Internet Protocol Television media content processor, and a cable television media content processor.

12. The computing device of claim 10, wherein the one or more activities further comprise a recording status of a media program recorded by a digital video recorder service managed by the media content processor and wherein the set top box operational information comprises computer processing unit usage statistics.

13. The computing device of claim 10, wherein the execution of the computer instructions causes the controller to:
construct a message associated with at least one of the one or more activities being monitored; and
present the message in a pop-up graphical user interface window associated with the iconic symbol.

14. The computing device of claim 13, wherein the execution of the computer instructions causes the controller to:
detect a pointer in a vicinity of a location of the iconic symbol; and
present the pop-up graphical user interface window with the message responsive to said detection.

15. The computing device of claim 13, wherein the execution of the computer instructions causes the controller to:
detect an event from the one or more activities being monitored;
construct the message according to the event; and
present the pop-up graphical user interface window with the message responsive to said detection.

16. The computing device of claim 10, wherein the execution of the computer instructions causes the controller to:
receive a message from the media content processor; and
present the message in a pop-up graphical user interface window.

17. The computing device of claim 10, wherein the execution of the computer instructions causes the controller to:
store the archive of the plurality of messages, each message being stored with a time stamp.

18. The computing device of claim 13, wherein the execution of the computer instructions causes the controller to:
detect a selection of the pop-up graphical user interface window; and
launch an application to manage one or more services of the media content processor.

19. A content media processor, comprising:
a memory comprising computer instructions; and
a controller coupled to the memory, wherein the controller when executing the computer instructions is configured to transmit over an Internet Protocol Television network to a computing device remote from the content media processor a plurality of activities taking place at the media content processor to present at the computing device an iconic symbol adjusted according to the plurality of activities, wherein the adjustment to the iconic symbol is performed when the plurality of activities commence, and wherein the plurality of activities comprise at least a download status of media content supplied by a video-on-demand service and content media processor operational information other than recording status comprising at least computer processing unit usage statistics of the content media processor, wherein the controller is further configured to construct a plurality of messages associated with at least the download status of the media content supplied by the video-on-demand service, store an archive of the plurality of messages, and present the plurality of messages responsive to detecting a selection of the iconic symbol.

20. The content media processor of claim 19, wherein the computing device corresponds to at least one among a cell phone, a personal digital assistant, and a computer, and wherein the media content processor corresponds to one among a satellite media content process, an Internet Protocol Television media content processor, and a cable television media content processor.

21. The content media processor of claim 19, wherein the plurality of activities further comprise a recording status of a media program recorded by a digital video recorder service managed by the media content processor.

22. The content media processor of claim 19, wherein the execution of the computer instructions causes the controller to transmit a message to the computing device which is presented by the computing device in a pop-up GUI window associated with the iconic symbol.

23. The content media processor of claim 22, wherein the execution of the computer instructions causes the controller to:
monitor one or more events associated with the plurality of activities being monitored;
detect at least one of the one or more events; and
generate the message responsive to said detection.

24. The content media processor of claim 19, wherein the execution of the computer instructions causes the controller to transmit the plurality of activities to the computing device by way of a portal.

* * * * *